United States Patent [19]

Nakajima

[11] Patent Number: 4,827,128

[45] Date of Patent: * May 2, 1989

[54] RADIATION IMAGE RECORDING AND READ-OUT APPARATUS

[75] Inventor: Nobuyoshi Nakajima, Kanagawa, Japan

[73] Assignee: Fuji Photo Film Co., Ltd., Kanagawa, Japan

[*] Notice: The portion of the term of this patent subsequent to Nov. 3, 2004 has been disclaimed.

[21] Appl. No.: 786,552

[22] Filed: Oct. 11, 1985

[30] Foreign Application Priority Data

Oct. 17, 1984 [JP] Japan .................................. 59-217947

[51] Int. Cl.$^4$ ............................................... G01T 1/105
[52] U.S. Cl. ................................. 250/327.2; 250/484.1
[58] Field of Search ........................... 350/327.2, 484.1; 378/181, 197, 198

[56] References Cited

U.S. PATENT DOCUMENTS

| | | |
|---|---|---|
| 2,492,339 | 12/1949 | Wagner. |
| 2,496,089 | 1/1950 | Goldfield et al. . |
| 2,518,884 | 8/1950 | Guentner et al. . |
| 3,971,949 | 7/1976 | Brather et al. ...................... 378/173 |
| 4,687,932 | 8/1987 | Tamura et al. ................... 250/327.2 |
| 4,704,529 | 11/1987 | Ohgoda et al. .................. 250/327.2 |

Primary Examiner—Carolyn E. Fields
Assistant Examiner—Richard Hanig
Attorney, Agent, or Firm—Sughrue, Mion, Zinn, Macpeak and Seas

[57] ABSTRACT

A built-in type radiation image and read-out apparatus comprises a main unit having a circulation and conveyance means for repeatedly conveying stimulable phosphor sheets through an image recording section, an image read-out section and an erasing section. A radiation source is provided separately from the main unit and the radiation source and the image recording section of the main unit can be moved up and down while maintaining a prescribed positional relation between them.

4 Claims, 4 Drawing Sheets

RADIATION IMAGE RECORDING AND READ-OUT APPARATUS

BACKGROUND OF THE INVENTION

1. Field of the Invention

This invention relates to a radiation image recording and read-out apparatus for exposing a stimulable phosphor sheet to a radiation passing through an object to have a radiation image of the object stored thereon, exposing the stimulable phosphor sheet to stimulating rays which cause it to emit light in proportion to the stored radiation energy, and photoelectrically detecting the emitted light to obtain an electric image signal.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in Japanese Unexamined Patent Publication No. 56(1981)-11395 and U.S. Pat. Nos. 4,258,264, 4,315,318, 4,387,428 and 4,276,473, it has been proposed to use a stimulable phosphor in a radiation image recording and reproducing system. Specifically, a sheet comprising the stimulable phosphor (hereinafter referred to as a stimulable phosphor sheet) is first exposed to a radiation passing through an object such as a part of the human body to have a radiation image stored thereon, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed so as to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used only for temporarily storing the radiation image in order to reproduce the final visible image therefrom in a final recording medium. For economical reasons, therefore, it is desirable that the stimulable phosphor sheet be used repeatedly.

In order to reuse stimulable phosphor sheets as described above, the radiation energy remaining on the stimulable phosphor sheet after it is scanned with stimulating rays to read out the radiation image stored thereon should be eliminated or erased by exposure to light or heat as described, for example, in Japanese Unexamined Patent Publication No. 56(1981)-12599 and U.S. Pat. No. 4,400,619. This stimulable phosphor sheet can then be used again for radiation image recording.

Contemporaneous Activities Within the Common Corporate Assignee

The applicant therefore proposed in U.S. patent application Ser. No. 600,689 a built-in type radiation image recording and read-out apparatus comprising:

(i) a circulation and conveyance means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and consisting of a stimulating ray source for emitting stimulating rays for scanning said stimulable phosphor sheet carrying said radiation image stored thereon in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, exposing said stimulable phosphor sheet to erasing light to release the radiation energy remaining on said stimulable phosphor sheet;

whereby said stimulable phosphor sheet is circulated through said image recording section, said image read-out section and said erasing section and reused for radiation image recording.

This built-in type radiation image recording and read-out apparatus is capable of successively recording and reading out a large number of radiation images with high efficiency and is, therefore, suitable for use in mass medical examinations. Moreover, it is compact enough to be installed in a vehicle like a bus serving as a mobile X-ray diagnostic station for mass medical examinations.

The built-in type radiation image recording and read-out apparatus comes in two types: the chest type and the bed type. In recording radiation images with the chest type apparatus, the object (person being examined) stands with the portion whose radiation image is to be recorded, e.g. the chest or abdomen, positioned at the image recording section of the apparatus. When the bed type is used, the radiation image is recorded with the object lying on a bed that constitutes a part of the apparatus.

In the case of the chest type apparatus, therefore, it is necessary for the portion whose radiation image is to be recorded and the image recording section to be brought opposite to each other. However, this is not always easy when the image recording section is of fixed height since the chest, abdomen and other portions whose radiation images are to be recorded are naturally at different heights, while even one and the same portion will be at different heights between a tall person and a short person. It is therefore desirable that the apparatus have a structure that enables the image recording section to be moved vertically so as to cope with differences in height.

Simply making the image recording section vertically movable is, however, not sufficient. This is because the apparatus also has a radiation source for emitting the radiation used for recording radiation images and this radiation source has to be maintained in a prescribed positional relation with respect to the image recording section. More specifically, the radiation source is located a prescribed distance in front of the image recording section in face-to-face relation therewith and has to be positioned so that its optical axis passes through the center of the image recording section, which is to say that the center of its field of radiation has to coincide with the center of the image recording section.

Therefore, if the image recording section is vertically moved, it is also necessary to move the radiation source up or down to maintain the required positional relationship. Separate adjustment of the heights of these two parts of the apparatus, however, is troublesome and time-consuming and, what is worse, is difficult to carry out with consistently high accuracy.

SUMMARY OF THE INVENTION

The primary object of the present invention is to provide a built-in type radiation image recording and read-out apparatus which can be simply, quickly and accurately adjusted for recording radiation images of object portions at different height levels.

Another object of the present invention is to provide a built-in type radiation image recording and readout apparatus of the chest type which can be simply, quickly and accurately adjusted for recording radiation images of object portions at different height levels.

The present invention provides a built-in type radiation image recording and read-out apparatus comprising:

- a main unit having an image recording section, an image read-out section, an erasing section and sheet circulation and conveyance means for repeatedly conveying stimulable phosphor sheets through the aforesaid three sections,
- a radiation source disposed to stand face to face with the image recording section of the main unit at a prescribed distance therefrom,
- a vertical transfer means for adjusting the height of the image recording section,
- a vertical transfer means for adjusting the height of the radiation source, and
- a control means for maintaining a prescribed positional relation between the image recording section and the radiation source at all adjusted heights thereof.

DESCRIPTION OF THE PREFERRED EMBODIMENT

The present invention will hereinbelow be described in further detail with reference to the accompanying drawings.

Figure 1:
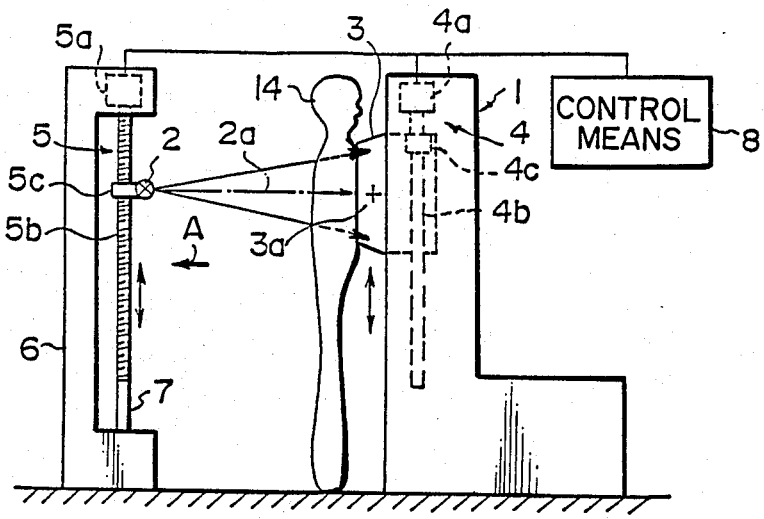
FIG. 1 is a schematic side view showing an embodiment of the radiation image recording and read-out apparatus according to the present invention.

Referring to FIG. 1, the radiation image recording and read-out apparatus is provided with a main recording and read-out unit 1 and a radiation source 2. The main unit 1 is provided with an image recording section 3 and, though not shown in FIG. 1, also with an image read-out section, an erasing section and a sheet circulation and conveyance means for conveying stimulable phosphor sheets through the aforesaid sections. These portions will be described in detail later.

The image recording section 3 of the main unit 1 is arranged to be vertically movable within the main unit 1. In the illustrated embodiment, the vertical movement of the recording section is accomplished by a vertical tranfer means 4 which comprises a motor 4a, an externally threaded screw 4b rotatable by the motor 4a, and an internally threaded member 4c fixed to the image recording section 3 and threadedly engaged with the screw 4b.

Figure 2:
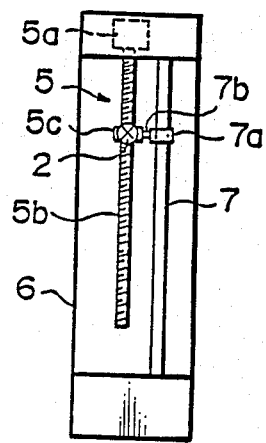
FIG. 2 is a view of the radiation source unit of the apparatus shown in FIG. 1 as seen in the direction of the arrow A.

The radiation source 2 is spaced a prescribed distance from the image recording section 3 and stands face to face therewith. Like the image recording section 3, the radiation source 2 is also arranged to be vertically movable. In the illustrated embodiment, the vertical movement of the radiation source is accomplished by a vertical tranfer means 5 which comprises a motor 5a, an externally threaded screw 5b rotatable by the motor 5a, and an internally threaded member 5c fixed to the radiation source 2 and threadedly engaged with the screw 5b. As best shown in FIG. 2, the vertical transfer means 5 is mounted on a frame 6 which is provided with a guide rod 7 running parallel to the screw 5b at a prescribed distance therefrom. A guide ring 7a is fit on the guide rod 7 and is connected with the internally threaded member 5c by a connector 7b.

The positional relation between the radiation source 2 and the image recording section 3 is such that the optical axis of the radiation source 2 passes through the center 3a of the image recording section 3, which is to say that the center of the radiation field of the radiation source 2 on the image recording section 3 coincides with the geometric center of the image recording section 3. This positional relation between the radiation source 2 and the image recording section 3 is herein referred to as the "prescribed positional relation."

The vertical transfer means 4 and 5 are controlled by a control means 8 in such manner that the prescribed positional relation is constantly maintained between radiation source 2 and the image recording section 3 as they are moved up and down. In the illustrated embodiment, the control means 8 accomplishes this control by sending to the motors 4a and 5a drive signals which cause these motors to rotate synchronously in the same direction and at the same speed. It is understood, of course, that the screws 4b and 5b have the same pitch.

The main recording and read-out unit 1 will now be described in detail with reference to FIGS. 4 and 5.

The main unit 1 is provided with an L-shaped circulation path 10, and stimulable phosphor sheets 11 are conveyed and circulated by a circulation and conveyance means 12 comprising conveyor rollers, conveyor belts and the like along the circulation path 10.

The image recording section 3, an image read-out section 20 and an erasing section 50 are positioned in this order in the sheet advancing direction as indicated by the arrows D on the circulation path 10.

At the image recording section 3, the stimulable phosphor sheet 11 is exposed to a radiation emitted by the radiation source 2 (see FIG. 1) and passing through an object 14 (see FIG. 1) to have a radiation image of the object 14 stored on the sheet 11. The image recording section 3 will be described in detail later.

The exposed sheet 11 is conveyed by the circulation and conveyance means 12 in the direction as indicated by the arrows D along the circulation path 10 into the image read-out section 20.

The image read-out section 20 comprises a stimulating ray source 22 for emitting stimulating rays 21, e.g. a laser beam, for scanning the sheet 11, and a photoelectric read-out means 23, e.g. a photomultiplier, for detecting light emitted by the sheet 11 upon exposure to the stimulating rays 21 and converting it into an electric image signal. Reference numeral 24 denotes a galvanometer mirror. The scanning of the sheet 11 by the stimulating rays 21 is carried out by reflecting the stimulating rays 21 off the galvanometer mirror 24 as it is swung in both directions, thereby causing the stimulating rays 21 to scan the sheet 11 in the main scanning direction (direction perpendicular to the direction of travel), while at the same time conveying the sheet 11 in the sub-scanning direction (direction indicated by the arrow D). An electric image signal obtained by the photomultiplier 59 is sent to an image processing circuit (not shown) for processing the electric image signal. The image signal thus processed is then sent to an image reproducing apparatus (not shown). The image reproducing apparatus may be a display device such as a cathode ray tube (CRT) or a device for recording a visible image by point-by-point scanning on a photographic film. Or, the image signal may be stored in a storage means such as a magnetic tape.

After the read-out step, the sheet 11 is sent by the circulation and conveyance means 12 to the erasing section 50.

The erasing section 50 is provided with many erasing light sources 51 constituted such as by tungsten, sodium, xenon or iodine lamps. The sheet 11 is exposed to erasing light emitted by the erasing light sources 51 to release the radiation energy remaining on the sheet 11.

The erased sheet 11 is then sent by the circulation and conveyance means 12 to the image recording section 3.

As described earlier, the image recording section 3 can be moved vertically by the vertical transfer means 4. More specifically, as shown in FIG. 5, the main unit 1 is provided with two parallel vertical support pillars 41 while the image recording section 3 is provided on opposite sides with a pair of guide rings 42 each of which is slidably fitted on one of the support pillars 41. Thus when the rotation of the motor 4a is transmitted to the screw 4b via belt 4d, the internally threaded member 4c and the image recording section 3 connected therewith are moved up or down depending on the direction of motor rotation.

At the upper end of the image recording section 3 is provided an upper sheet relay section 12a' comprising a pair of upper relay rollers 12a, and at the lower end thereof is provided with a lower sheet relay section 12b' comprising a pair of lower relay rollers 12b. As shown in FIG. 5, the upper and lower sheet relay sections 12a' and 12b' are supported to be vertically slidable but are connected with each other by connecting members 43 so as to slide unitarily.

Above the upper sheet relay section 12a' is a belt support roller of the circulation and conveyance means 12, and below the lower relay section 12b, is provided a lower fixed roller 12d which is also paired with a belt support roller of the circulation and conveyance means 12. The fixed rollers 12c and 12d are rotatable but cannot move vertically. A pair of upper recording section rollers 12e and a pair of lower recording section rollers 12f are provided within the image recording section 3 near the top and bottom thereof, respectively. The relay rollers 12a, 12b, the fixed rollers 12c, 12d, and the recording section rollers 12e, 12f are so arranged that the interval between adjacent roller pairs is always shorter than the length of sheets 11 regardless of the positions assumed by the image section 3 and the upper and lower relay rollers 12a and 12b. As a result a sheet 11 conveyed through these rollers is at all times gripped by at least one pair of them.

On the upper and lower surfaces 3c and 3d of the image recording section 3 are respectively provided spacers 65a and 65b for coming into abutment with the upper and lower sheet relay sections 12a' and 12b'. Further, for preventing the upper and lower fixed rollers 12c, 12d from interfering with the upper and lower relay rollers 12a, 12b, a spacer 67a for abutment with the upper sheet relay section 12a' is provided on the lower surface of an upper bracket 66a fixed to the main unit 1 and a spacer 67b for abutment with the lower sheet relay section 12b' is provided on the upper surface of a lower bracket 66b also fixed to the main unit 1.

Figure 5:
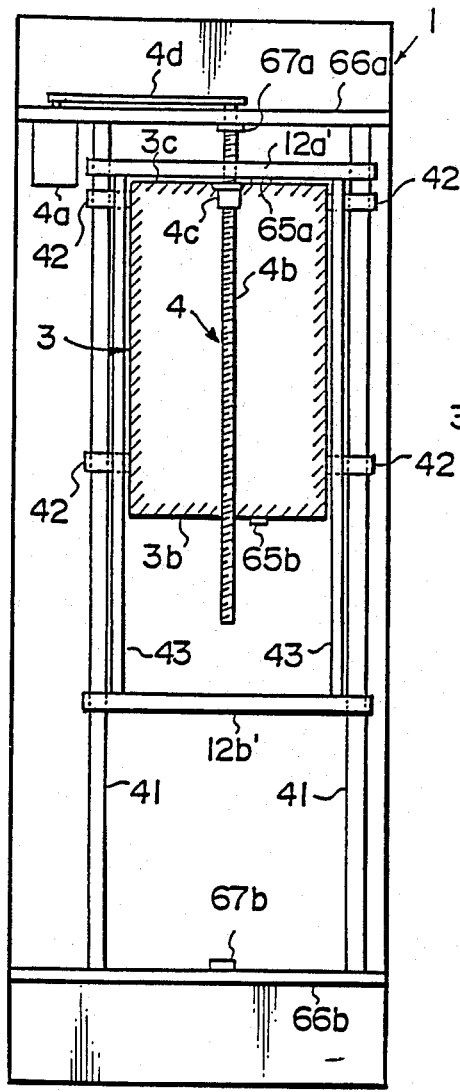
FIG. 5 is a sectional view of the main unit of the apparatus taken along plane C in FIG. 3.

When the image recording section 3 descends from the position shown in FIG. 5, the upper and lower sheet relay sections 12a', 12b' integrally connected by the connecting members 43 descend together therewith. During this descent, the spacer 65a provided on the upper surface 3c of the image recording section 3 remains in abutment with the lower surface of the upper sheet relay section 12a' until such time as the lower surface of the lower sheet relay section 12b' comes into contact with the spacer 67b provided on the upper surface of the bracket 66b, whereafter the image recording section 3 alone continues to descend until the spacer 65b provided on the lower surface 3b thereof strikes against the lower sheet relay section 12b' which is now at the lowest position it can assume.

When the image recording section 3 ascends from this lowermost position, it rises by itself until the spacer 65a provided on its upper surface strikes against the lower surface of the upper sheet relay section 12a', whereafter it ascends together with the integrally connected upper and lower sheet relay sections 12a' and 12b' until the upper surface of the upper sheet relay section 12a' makes contact with the spacer 67a provided on the lower surface of the upper bracket 67a.

The sheets 11 are introduced into the image recording section 3 by the upper relay rollers 12a and the upper recording section rollers 12e to be clamped between a front sheet retaining plate 31 and a rear sheet retaining plate 32. Image recording is conducted with the sheet 11 retained between these two plates, which are both formed of plastic, aluminum or other such material that uniformly transmits radiation. As shown in the drawings, the sheet retaining plates 31 and 32 are spread at their upper extremities to form an opening. The sheet 11 is fed into this opening from above and moves downward until stopped by a closure member 33 provided to shut the opening between the lower extremities of the two sheet retaining plates. The front sheet retaining plate 31 then swings forward about its pivoted upper end and the rear retaining sheet 32, following this movement, also swings forward. As a result, the sheet 11 is clamped between the two sheet retaining plates 31 and 32 as shown by the two-dot chain lines in FIG. 4, readying it for recording of a radiation image thereon. After the sheet 11 has been exposed, the sheet retaining plates 31 and 32 return to the positions indicated by solid lines and the closure member 33 opens to allow the sheet 11 to be received by a pair of receiving rollers 12g and then to be conveyed out of the image recording section 3 by the lower recording section rollers 12f.

Here it should be noted that various mechanisms can be used for retaining the sheet 11 within the image recording section 3. For example, in place of the relatively complex arrangement just described, there can, as shown by two-dot chain lines in FIG. 4, be used a pair of endless belts 34 and 35 for clamping the sheet 11 therebetween. Further, if desired, the pair of endless belts 34 and 35 can be arranged to be horizontally movable with the sheet 11 held therebetween.

Figure 6:
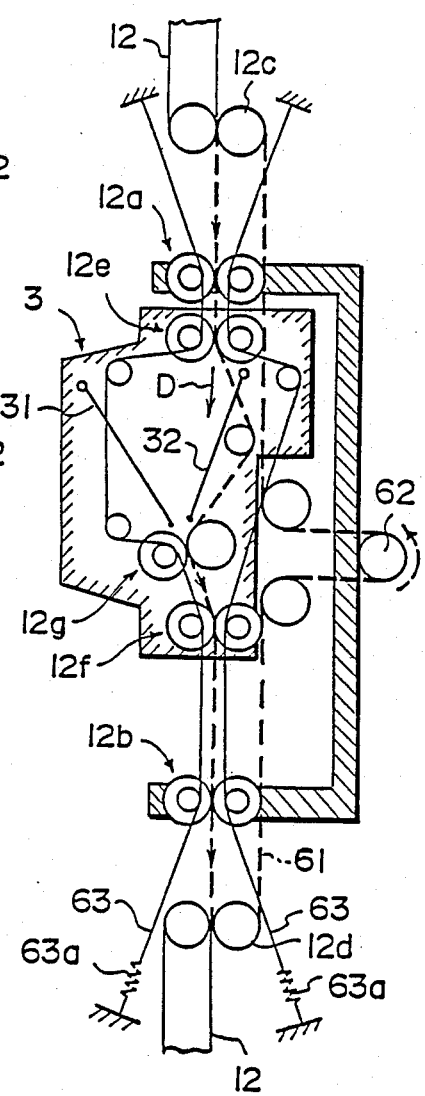
FIG. 6 is a schematic view of the image recording section of the apparatus shown together with the rollers in the vicinity of the image recording section.
Figure 7:
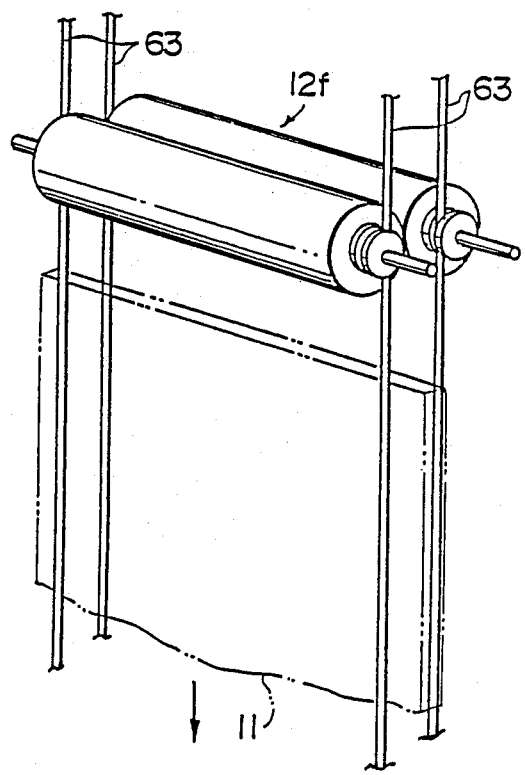
FIG. 7 is a perspective view showing the relation between sheet guide belts and a stimulable phosphor sheet.

FIG. 6 is a schematic view showing the arrangement of the rollers in the image recording section 3 as well as those in the nearby portions of the circulation and conveyance means 12. One of each of the upper and lower fixed rollers 12c, 12d, the upper and lower sheet relay rollers 12a, 12b, the upper and lower recording section rollers 12e, 12f and the receiving rollers 12g has a sprocket (not shown) provided on its shaft, and these rollers are driven by an endless chain 61 passed around these sprockets and also around a sprocket 62 driven by a motor or the like (not shown). In order to assure smooth downward conveyance of the sheet 11 between the respective roller pairs without pulling or compressing, all rollers have approximately the same diameter and all sprockets approximately the same pitch. Guidance of the sheets 11 through the rollers is facilitated by the provision of sheet guide belts 63 which are held in tensioned engagement with the upper and lower relay rollers 12a, 12b, the upper and lower recording section rollers 12e, 12f, and one of the receiving rollers 12g by springs 63a. The manner in which the sheet 11 is guided by the guide belts 63 is shown in FIG. 7.

Figure 3:
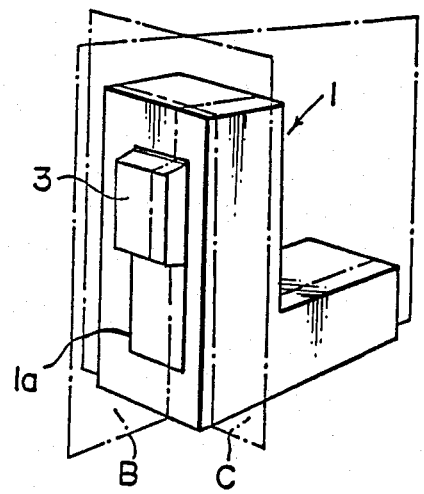
FIG. 3 is a perspective view of the main unit of the apparatus.
Figure 4:
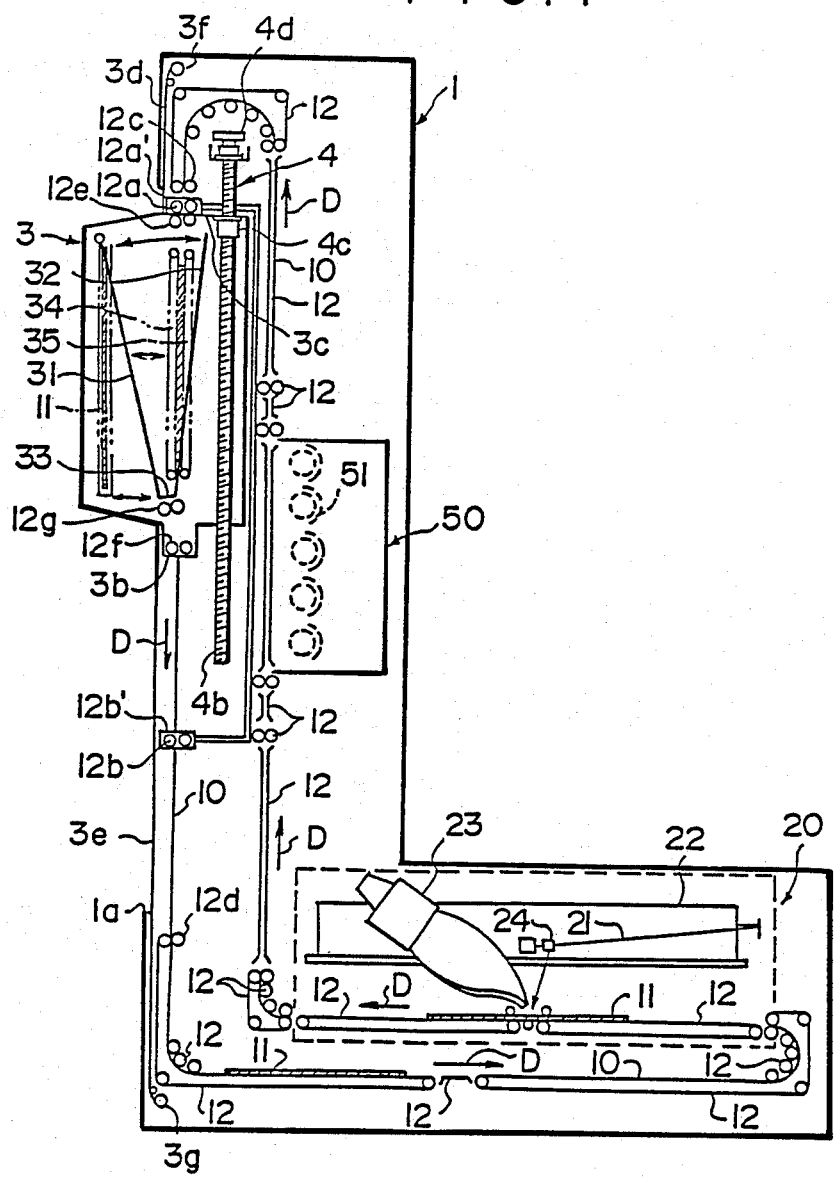
FIG. 4 is a sectional view of the main unit of the apparatus taken along plane B in FIG. 3.

To allow the image recording section 3 to move up and down within the main unit 1, the main unit 1 is provided with a window 1a (see FIGS. 3 and 4). For closing the portions of the window 1a not occupied by the image recording section 3, the main unit 1 is provided with a first flexible wall member 3d attached to and extending upwardly from the upper end of the image recording section 3 and a second flexible wall member 3e attached to and 25 extending downwardly from the lower end of the same. The distal ends of the flexible wall members 3d and 3e are taken up on and fed out from rollers 3f and 3g when the image recording section moves up and down.

The apparatus according to this invention is characterized in that the image recording section 3 and the radiation source 2 can be raised and lowered while maintaining a prescribed positional relation between them. This feature can be realized not only by the arrangement described in respect of the foregoing embodiment but also by various other arrangements falling within the scope of the invention.

I claim:

1. A radiation image recording and read-out apparatus comprising:
    (i) a main unit having a circulation and conveyance means for conveying at least one stimulable phosphor sheet for recording a radiation image thereon along a predetermined circulation path; an image recording means positioned on said circulation path for recording a radiation transmission image of an object on said stimulable phosphor sheet by exposing said stimulable phosphor sheet to a radiation passing through said object; an image read-out means positioned on said circulation path and consisting of a stimulating ray source for emitting stimulating rays for scanning said stimulable phosphor sheet carrying said radiation image stored thereon in said image recording means, and a photoelectric read-out device for detecting light emitted from said stimulable phosphor sheet scanned with said stimulating rays to obtain an electric image signal; and an erasing means for, prior to the next image recording on said stimulable phosphor sheet for which the image read-out has been conducted in said image read-out means, having said stimulable phosphor sheet release the radiation energy remaining on said stimulable phosphor sheet,
    (ii) a radiation source disposed to stand face to face with the image recording means of the main unit at a prescribed distance therefrom,
    (iii) a vertical transfer means for adjusting the height of the image recording means,
    (iv) a vertical transfer means for adjusting the height of the radiation source,
    (v) a control means for maintaining a prescribed positional relation between the image recording means and the radiation source at all adjusted heights thereof, and
    (vi) said image recording means being movable along a part of the circulation path and including means for receiving stimulable phosphor sheets from and for transferring said sheets to other parts of said radiation image recording and read-out apparatus irrespective of adjustment of position of said image recording means along said path to maintain said prescribed positional relation between said image recording means and the radiation source.

2. An apparatus as defined in claim 1 wherein the vertical transfer means for adjusting the height of the image recording means and that for adjusting the height of the radiation source both comprise an externally threaded screw and an internally threaded member engaged therewith.

3. An apparatus as defined in claim 2 wherein a separate motor is provided for driving each of the externally threaded screws.

4. An apparatus as defined in claim 3 wherein the control means comprises means for sending drive signals to the motors for causing them to rotate synchronously in the same direction and at the same speed.

* * * * *